United States Patent
Kludt

(10) Patent No.: US 9,083,410 B2
(45) Date of Patent: Jul. 14, 2015

(54) CONTROL OF SAR IN MOBILE TRANSMIT DIVERSITY SYSTEMS EMPLOYING BEAM FORMING BY USING COUPLING BETWEEN DIVERSITY BRANCHES

(75) Inventor: Kenneth Kludt, San Jose, CA (US)

(73) Assignee: GOOGLE INC., Mountain View, CA (US)

( * ) Notice: Subject to any disclaimer, the term of this patent is extended or adjusted under 35 U.S.C. 154(b) by 9 days.

(21) Appl. No.: 14/130,729

(22) PCT Filed: Jul. 8, 2012

(86) PCT No.: PCT/US2012/045881
§ 371 (c)(1),
(2), (4) Date: Jan. 3, 2014

(87) PCT Pub. No.: WO2013/009664
PCT Pub. Date: Jan. 17, 2013

(65) Prior Publication Data
US 2014/0133594 A1 May 15, 2014

Related U.S. Application Data

(60) Provisional application No. 61/505,872, filed on Jul. 8, 2011.

(51) Int. Cl.
*H03C 7/02* (2006.01)
*H04B 7/06* (2006.01)
*H01Q 1/24* (2006.01)
*H04B 1/3827* (2015.01)
*H01Q 25/02* (2006.01)
*H01Q 3/26* (2006.01)

(52) U.S. Cl.
CPC ............ *H04B 7/0617* (2013.01); *H01Q 1/245* (2013.01); *H01Q 3/26* (2013.01); *H01Q 25/02* (2013.01); *H04B 1/3838* (2013.01); *H04B 7/0671* (2013.01); *H04B 7/0682* (2013.01)

(58) Field of Classification Search
CPC ...... H04B 7/0404; H04B 7/06; H04B 7/0613; H04B 7/0615; H04B 7/0667; H04B 7/0671; H04B 7/0682; H04W 52/42
USPC ............................... 455/101, 117, 115.3, 123
See application file for complete search history.

(56) References Cited

U.S. PATENT DOCUMENTS

| | | | |
|---|---|---|---|
| 6,415,140 B1 * | 7/2002 | Benjamin et al. | 455/275 |
| 6,859,643 B1 * | 2/2005 | Ma et al. | 455/101 |
| 8,055,216 B2 * | 11/2011 | Dent | 455/114.2 |
| 8,432,997 B2 * | 4/2013 | Lorenz et al. | 455/101 |

(Continued)

FOREIGN PATENT DOCUMENTS

| | | |
|---|---|---|
| WO | 2009/051558 | 4/2009 |
| WO | 2011/061727 | 5/2011 |

OTHER PUBLICATIONS

International Search Report and Written Opinion, European Patent Office, Application No. PCT/US2012/045881, Nov. 12, 2012.

*Primary Examiner* — Duc M Nguyen
(74) *Attorney, Agent, or Firm* — Gottlieb, Rackman & Reisman, PC

(57) ABSTRACT

A system and method for maximizing signal strength while limiting specific absorption rate in diversity transmission network is achieved by coupling a first input signal to a second input signal. The system includes a sampler, a coupling network, and combiner.

15 Claims, 5 Drawing Sheets

(56) References Cited

U.S. PATENT DOCUMENTS

| | | |
|---|---|---|
| 8,442,457 B2* | 5/2013 | Harel et al. ............ 455/101 |
| 8,630,596 B2* | 1/2014 | Harel et al. ............ 455/117 |
| 2005/0226353 A1 | 10/2005 | Gebara et al. |
| 2006/0009168 A1* | 1/2006 | Khan et al. ............ 455/101 |
| 2008/0311858 A1* | 12/2008 | Cheng et al. ............ 455/69 |
| 2009/0047998 A1* | 2/2009 | Alberth, Jr. ............ 455/562.1 |
| 2011/0014958 A1* | 1/2011 | Black et al. ............ 455/575.7 |
| 2011/0090126 A1 | 4/2011 | Szini et al. |
| 2012/0275350 A1* | 11/2012 | Kwok ............ 370/277 |

* cited by examiner

CONTROL OF SAR IN MOBILE TRANSMIT DIVERSITY SYSTEMS EMPLOYING BEAM FORMING BY USING COUPLING BETWEEN DIVERSITY BRANCHES

PRIORITY

This application claims priority of U.S. Provisional Patent Application No. 61/505,872, filed Jul. 8, 2011, which is incorporated herein by reference. Additionally, this application is related to PCT/US2012/043632, filed Jun. 21, 2012, which is also incorporated herein by reference.

FIELD

This disclosure relates to mobile transmission diversity systems having control over Specific Absorption Rate and Total Radiated Power.

BACKGROUND

Signal transmission between a mobile device and a base station is enhanced through mobile transmission diversity (MTD), sometimes referred to as beam forming. One form of MTD employs multiple antennas in the mobile unit, each antenna transmitting identical data. The phase difference between the signals from the two or more antennas is controlled so that constructive interference of the signals received at a base station provides power received at the base station greater than the arithmetic sum of the received power that would be radiated from each of the antennas in the absence of the other(s). By varying the phase difference between the signals from the antennas, the peak radiated power may be steered to focus upon the antenna of the base station. Typically two antennas are used for MTD.

Since the phase of a signal reaching a base antenna is affected by changes of path length such as due to reflections, closed loop MTD has been developed where the phase difference at the multiple mobile unit antennas is adjusted in response to feedback from the base station. In particular a quality factor such as bit error rate, or a Power Control Bit (PCB) or Transmitter Power Control (TPC) parameter determined at the base station may be communicated back to the mobile device, or the base station may return a signal indicating whether the received power should be lowered or raised. This communication from the base signals the need to adjust the phase difference between the antenna outputs.

Since the mobile device is located close to a user, the amount of radiation impinging on the user is also monitored. The Specific Absorption Rate (SAR) is a measure of the amount of power absorbed by biologic tissue and a goal is to keep the SAR below a predetermined value. Absorption levels may be typically defined and measured by placing a liquid-filled phantom head, hand, or other emulated body part close to the edge(s) of a mobile device while transmitting. Measurements of a rise in the liquid's temperature provide an indication of the radiation exposure overall or at particular points To meet SAR requirements the conventional approach may be to set the antenna radiation limits based on peak radiation points rather than peak radiated averages (i.e. total radiated power (TRP)). This conventional approach may cause vendors to limit the maximum power and or the maximum data rate.

BRIEF DESCRIPTION

An apparatus and method has been developed to reduce SAR at near field locations for a mobile device where SAR would otherwise attain its highest value. It relies on what hitherto has been regarded as a problem in mobile diversity systems. In particular, because the antennas in a MTD system are close to each other, the broadcasting antennas receive strong signals from each other inducing currents in each other's antenna circuits. These currents introduce, by means of standing waves resulting from antenna interaction, a complexity in assigning phases to the antenna transmission. In the present disclosure instead of treating the interaction between antenna currents as a detriment the antenna circuits are coupled in such a manner as to convert the interaction between currents in the antenna circuits into a feature utilized to reduce SAR by designing appropriate coupling circuits between antennas and by providing a system so designed. VSWR (Voltage Standing Wave Ratio) is a measure of the impedance mismatch between an antenna and its power amplifier. In the presence of such coupling circuits the phase adjustments may be carried out and the presence of the standing waves, as determined by the coupling circuits (and quantified as VSWR), used to provide a preferred safe SAR level that can be maintained during phase adjustment. The signal being coupled from one antenna to another may be used to constructively or destructively interfere with the existing signal to manipulate the output signal to provide a preferred SAR level.

This disclosure enables a mobile transmit diversity device comprising a plurality of antennas, each antenna receiving a signal from a respective power amplifier. The power amplifiers and antennas are each connected by a circuit, where the circuits include coupling elements located between separate circuits. The coupling circuits are chosen to produce reflection coefficients and VSWR values in an antenna circuit that reduce TRP at a phase setting that produces the worst case SAR by the coupled signals among the antennas. That example may produce maximum TRP without exceeding a preset SAR limit or threshold.

DETAILED DESCRIPTION

Two issues affect MTD performance: (1) In a situation where there are two antennas termed primary and secondary, there is a "worst" phase in which antennas are set where the signals from each antenna add to create the highest Specific Absorption Rate (SAR). In general, this effect is caused by a near-field addition of the signal fluxes from each antenna at a phase relationship where the signals at the antennas are in phase to that point. (2) The second issue is related to the interaction between antenna Voltage Standing Wave Ratio (VSWR) and the coupling between antennas. As the phase between the two antennas is changed (such as is done in "pointing a beam") there is a change in the Total Radiated Power (TRP). This change in TRP is likely due to the fact that the power coupled from one antenna to another combines with the voltage reflected from that antenna, increasing and decreasing the apparent VSWR seen by the power amplifier (PA). Since this effect is due to the two voltages adding or subtracting, it is dependent on the relative phase of the two signals.

The present disclosure relates to a design methodology such that the electrical phase difference that creates the maximum value of SAR has a somewhat lower TRP, but with such an implementation, the mobile device will operate with higher average TRP without exceeding the SAR limit.

Figure 1:
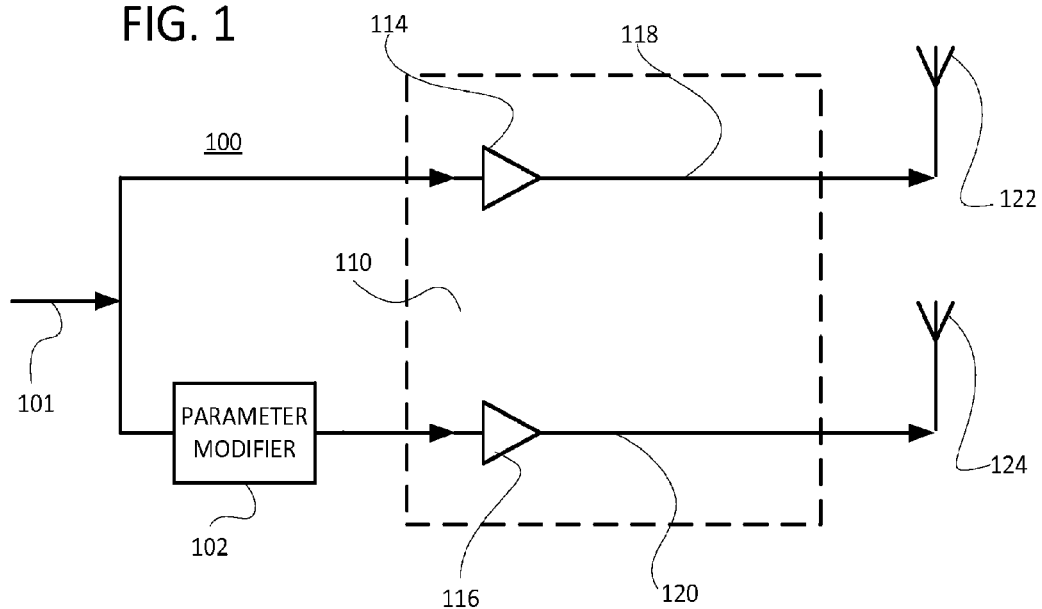
FIG. 1 depicts a basic method of adjusting diversity parameters for beamforming transmit diversity.

FIG. 1 illustrates a basic two antenna MTD system 100, having a coupling system 110. The signal 101 is divided into two copies, where the lower copy is modified by the Parameter Modifier 112. The Parameter modifier 112 modifies the phase of the signal 101 in order to maximize TRP at the receiver. The two copies of signal 101 are further amplified by power amplifiers 114 and 116 to form respective signals 118 and 120. The two signals 118 and 120 are radiated by antennas 122 and 124, respectively.

Figure 2:
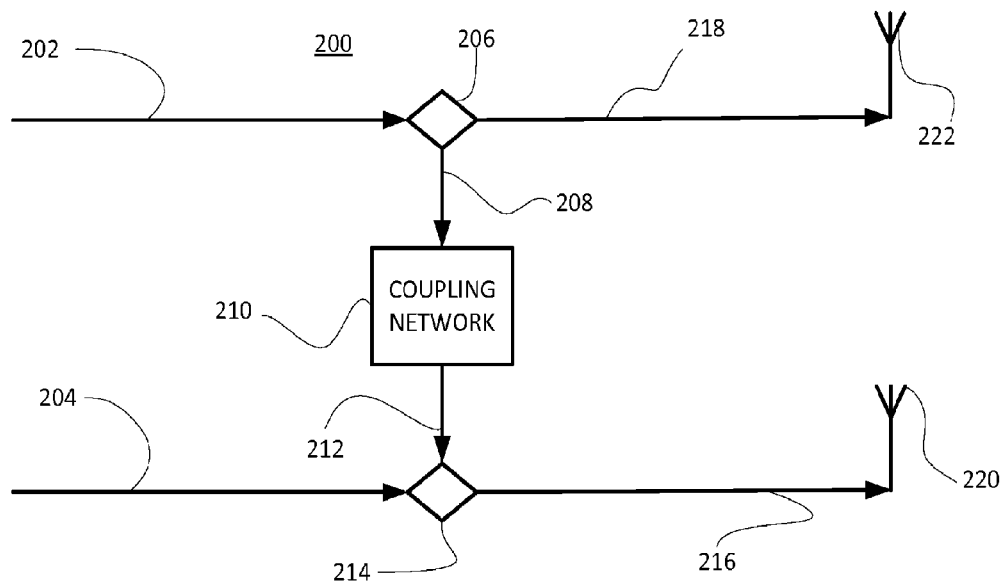
FIG. 2 depicts sampling the signal on one branch of a two branch diversity transmit system, modifying the parameters of that signal and injecting the signal into the second branch in one example of this disclosure.

As shown in the example of FIG. 2, the coupling system 200 receives two input signals, signal 202 and signal 204. The second input signal 204 has been modified in accordance with known diversity transmission techniques. Signal 202 is sampled by sampler 206, outputting signal 208 and first output signal 218. Signal 218 is relayed to a first antenna 222. Signal 208 is relayed to a coupling network 210 where it is modified to form signal 212. Signal 212 is combined with the second input signal 204 at combiner 214 to form a second output signal 216. The second output signal 216 is relayed to a second antenna 220. The second output signal 216 will be increased or decreased in amplitude by the coupling system 200 depending on the relative phase of signal 202 with respect to signal 204. Further, the coupling network 210 may shift the phase of signal 212 in order to establish constructive or destructive interference between the signals.

The voltage amplitude of the second output signal 216 is proportional to the sum of the voltage of signal 204 plus the voltage of signal 212 when the two signals are substantially coherent and in-phase. Further, the voltage amplitude of the second output signal 216 is proportional to the difference of the voltages of signal 204 and the voltage of signal 212 when the two signals are coherent and opposite (+/−180 degrees) in phase. Since the phase of signal 212 is manipulated by the coupling network 210, the coupling network 210 may be used to set the relative phase difference of signal 204 and signal 212, thereby establishing the voltage amplitude of the second output signal 216. Accordingly, the coupling network 210 may be adjusted to establish a maximum TRP at a receiver without exceeding a predetermined SAR.

EXAMPLES

In one example, the second output signal 216 is 10 dB weaker than the second input signal 204. This variation caused by the coupling network 210 results in a 3 dB decrease in SAR caused by the system 200.

Figure 3:
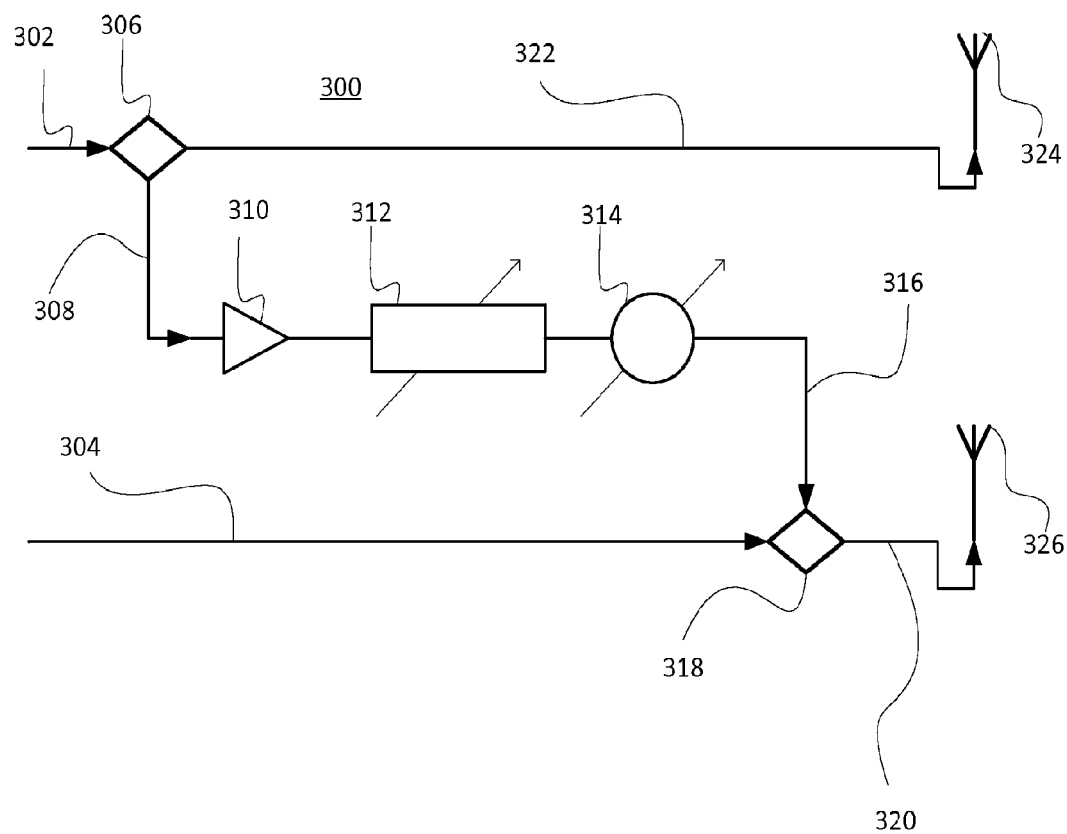
FIG. 3 depicts another example of a depiction of a diversity transmit system of the present disclosure.

FIG. 3 illustrates another example of an MTD system using two coupled antennas. In this example, system 300 includes two input signals—signal 302 and signal 304. The first input signal 302 is divided by sampler 306 into a first output signal 322 and a coupling signal 308. The coupling signal 308 passes through amplifier 310, attenuator 312, and phase shifter 314 to form signal 316. Signal 316 and the second input signal 304 are combined by combiner 318 to produce a second output signal 320. The first output signal 322 and the second output signal 320 are radiated by antenna 324 and antenna 326, respectively.

Figure 4:
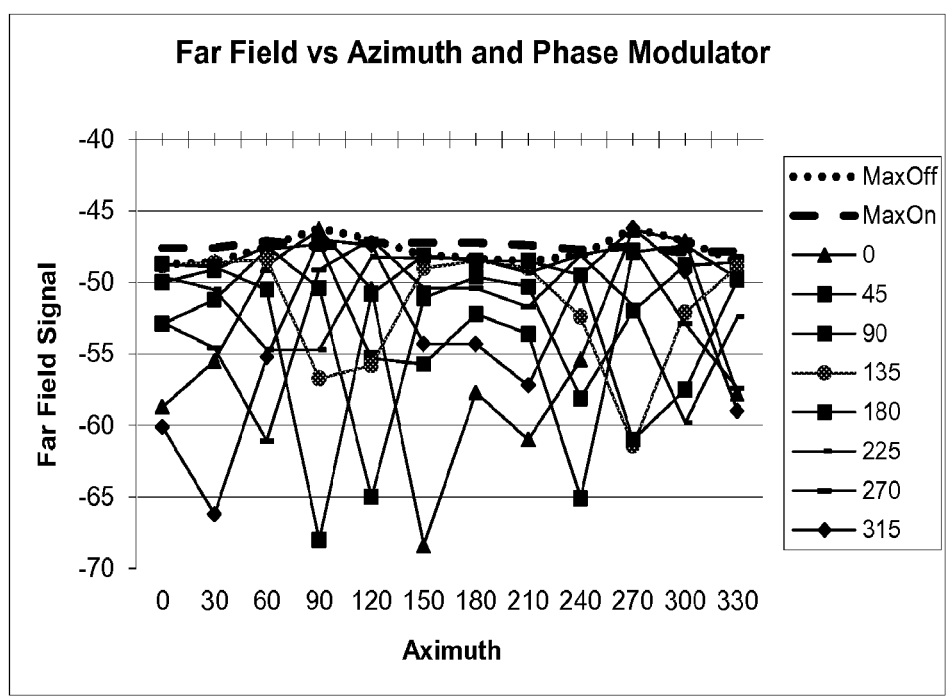
FIG. 4 is a chart showing the far field signal strength at varying azimuth points of a signal transmitted by an example of the present disclosure.
Figure 5:
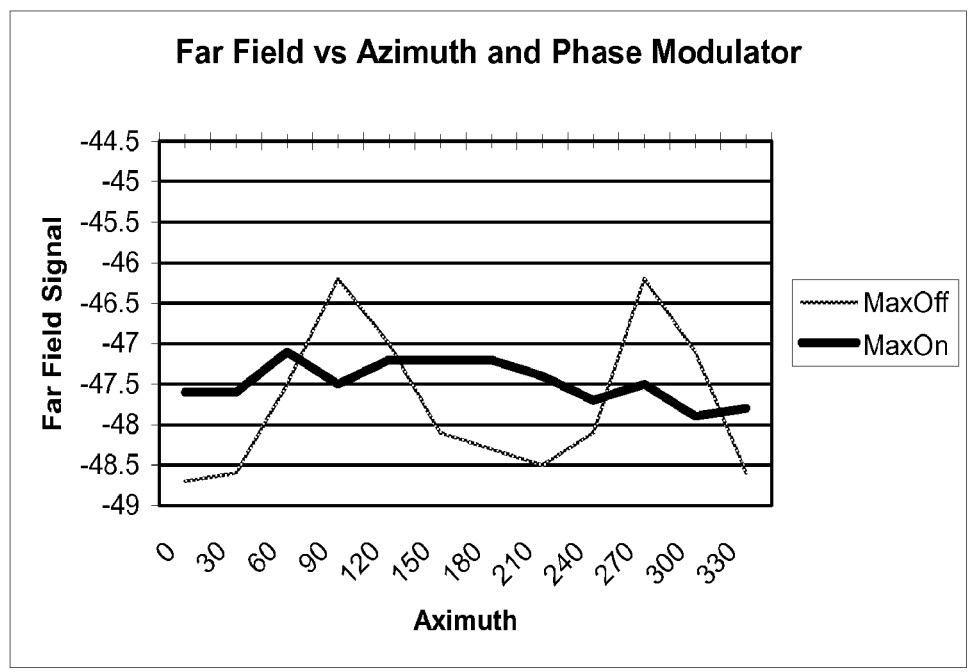
FIG. 5 is a chart showing the data of FIG. 4, modified to show only maximum and minimum values.

FIG. 4 shows sample data illustrating the Far Field Signal of the diversity transmission system 200, 300 at 30 degree Azimuth intervals. The various lines in the graph represent varying phase shifts of the coupling network. The Far Field Signal corresponds to the TRP of the system. In FIG. 5, the data is simplified to show only the peak values relating to constructive interference phase values. The lighter line represents the Far Field Signal with no coupling and the darker line represents the Far Field Signal when coupling is applied. Based on these results, it is shown that the Far Field Signal may be increased at certain Azimuth positions using the coupling system 200.

Figure 6:
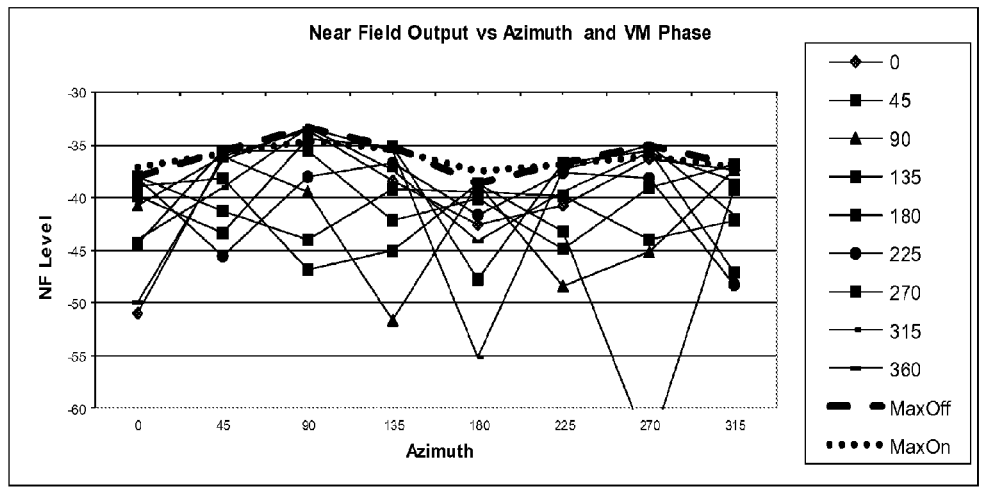
FIG. 6 is a chart showing the near field signal strength at varying azimuth points of a signal transmitted by an example of the present disclosure.
Figure 7:
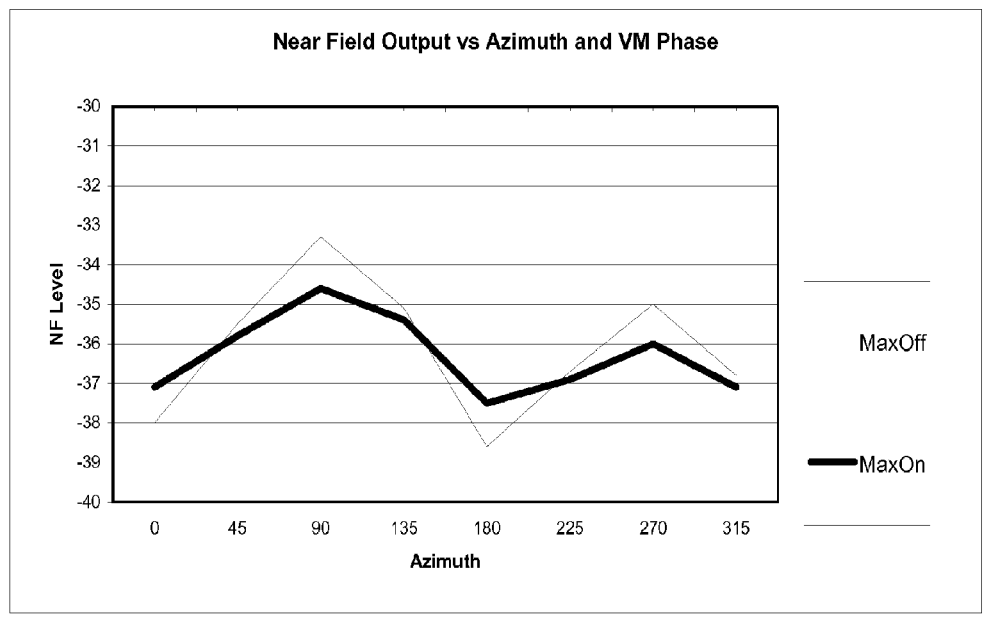
FIG. 7 is a chart showing the data of FIG. 6, modified to show only maximum and minimum values.

Similarly, FIGS. 6 and 7 show sample data illustrating the Near Field Output of the diversity transmission system 200, 300 at 45 degree Azimuth intervals. The varying lines in FIG. 6 represent varying phase shifted signals of the coupling network. In FIG. 7, only the peak values are shown. The Near Field Output corresponds to the SAR caused by the system. The data illustrate that the coupling system 200, 300 will lower maximum Near Field Signal levels at certain Azimuths, e.g., 90 degrees and 270 degrees.

Accordingly, the system 200, 300 may be used to maximize TRP while maintaining predetermined SAR levels.

Although this example has been described with particular parameter values, it should be understood that the example is representative of a system/method that is not tied to those particular values or to the circuitry under which the example is assumed to function. Persons of skill in this art will know how to adapt this example to different parameter values and different specific hardware. While certain features of the disclosure have been illustrated and described herein, many modification, substitutions, changes, and equivalents will now occur to those of ordinary skill in the art. It is, therefore to be understood that the appended claims are intended to cover all such modifications and changes as fall within the true spirit of the disclosure.

The invention claimed is:

1. A communication system comprising:
    a first input, the first input adapted to receive a first input signal;
    a second input, the second input adapted to receive a second input signal, wherein the first input signal and the second input signal are configured for diversity transmission;
    a coupling network, the coupling network connected to the first input and the second input, where the coupling network is adapted to combine a sample of the first input signal with the second input signal to form a coupled output signal;
    a first antenna, the first antenna adapted to radiate the first input signal;
    a second antenna, the second antenna adapted to radiate the coupled output signal;
    wherein the coupling network is adapted to maximize a diversity signal strength of the first input signal and the coupled output signal, while maintaining specific absorption rate below a predefined level.

2. The system of claim 1, wherein the coupling network is adapted to adjust the amplitude of the sampled first input signal.

3. The system of claim 1, wherein the coupling network is adapted to adjust the phase of the sampled first input signal.

4. The system of claim 1, wherein the coupling network includes an attenuator and a phase shifter.

5. The system of claim 4, wherein the phase shifter is adapted to adjust the phase of the sampled first input signal to be in phase with the second input signal.

6. The system of claim 4, wherein the phase shifter is adapted to adjust the phase of the sampled first input signal to be opposite in phase with the second input signal.

7. The system of claim 1, wherein the amplitude of the first input signal is modified depending on the relative phase of the first input signal with respect to the second input signal.

8. A method for maximizing diversity signal strength without exceeding a specific absorption rate by coupling a first input signal and a second input signal in a diversity transmission system, the method comprising the steps of:
sampling the first input signal between a first antenna and a coupling network;
modifying the sample of the first input signal;
combining the second input signal with the modified sample of the first input signal, and radiating the combined signal from a second antenna;
radiating the first input signal from the first antenna;
wherein the signal radiated from the first antenna and the signal radiated from the second antenna are adapted to form a diversity transmission signal; and
wherein the coupling network is adapted to maintain specific absorption rate below a predefined level.

9. The method of claim 8, further comprising the step of coupling a third input signal to a signal selected from the group consisting of: the first input signal and the second input signal.

10. The method of claim 8, wherein the step of modifying the sample of the first input signal includes increasing the amplitude of the first input signal.

11. The method of claim 8, wherein the step of modifying the sample of the first input signal includes decreasing the amplitude of the first input signal.

12. The method of claim 8, wherein the step of modifying the sample of the first input signal includes shifting the phase of the first input signal.

13. The method of claim 8, wherein the step of modifying the sample of the first input signal includes both decreasing the amplitude of the first input signal and phase shifting the first input signal.

14. A diversity transmission circuit comprising:
an input, the input adapted to receive a signal for transmission to a receiver located at a location;
a sampler adapted to divide the input into a first signal and a second signal;
a parameter modifier adapted to modify the second signal in order to direct the signal for transmission to the location;
a first antenna adapted to receive and transmit the first signal;
a coupling network receiving the first signal and modifying the first signal, the coupling network outputting the modified first signal to a combiner, the combiner also receiving the modified second signal and outputting a combination of the modified first signal and the modified second signal to a second antenna, the second antenna adapted to receive and transmit the combined signal.

15. The system of claim 14, wherein the coupling network is adapted to modify the amplitude and phase of the first signal in order to maintain a specific absorption rate below a predetermined level.

* * * * *